United States Patent [19]
Calder

[11] 3,806,035
[45] Apr. 23, 1974

[54] JET PROPULSION POWER PLANT

[75] Inventor: Peter Henry Calder, Bristol, England

[73] Assignee: Rolls-Royce (1971) Limited, London, England

[22] Filed: June 27, 1972

[21] Appl. No.: 266,683

[30] Foreign Application Priority Data
July 6, 1971    Great Britain................... 31516/71

[52] U.S. Cl.... 239/265.17, 239/265.29, 239/265.41
[51] Int. Cl........................ B63h 25/46, B64c 15/10
[58] Field of Search..... 239/265.17, 265.23, 265.25, 239/265.27, 265.29, 265.37, 265.39, 265.41

[56]            References Cited
          UNITED STATES PATENTS
| | | | |
|---|---|---|---|
| 3,262,264 | 7/1966 | Gardiner et al................ | 239/265.29 |
| 2,886,946 | 5/1959 | Parker........................... | 239/265.27 |
| 3,467,312 | 9/1969 | Mehr............................. | 239/265.41 |
| 3,463,402 | 8/1969 | Langston, Jr.................. | 239/265.17 |
| 3,615,052 | 10/1971 | Tumavicus.................... | 239/265.39 |
| 3,687,399 | 8/1972 | Tumavicus.................... | 239/265.39 |

*Primary Examiner*—Lloyd L. King
*Attorney, Agent, or Firm*—Stevens, Davis, Miller & Mosher

[57]            ABSTRACT

A jet propulsion power plant having a convergent nozzle followed by a structure capable of functioning alternatively as a divergent nozzle or an air entrainment silencer or as a thrust reverser. The structure comprises essentially, a duct surrounding the convergent nozzle and having downstream of the throat of the nozzle a panel pivoted at its downstream end to the duct wall. In a first pivotal position the panel is inclined to the flow axis of the convergent nozzle and forms a divergent nozzle for guiding the expansion of the gases at supercritical pressure ratios. When the panel is pivoted into a second position flush with the duct wall, i.e. parallel to said flow axis, the duct volume is increased for increasing the entrainment of air for silencing and thrust augmentation purposes. In a third position the panel extends obliquely across the flow path of gases from the convergent nozzle so as to divert the flow through an outlet opening in the duct wall. The opening is closed by the panel when the latter is in the first or second position.

5 Claims, 6 Drawing Figures

JET PROPULSION POWER PLANT

This invention relates to a jet propulsion power plant having exhaust apparatus of the kind providing in combination a convergent nozzle and a divergent nozzle, the divergent nozzle comprising, in a position downstream of the throat of the convergent nozzle, a throat larger than that of the convergent nozzle and diverging wall means extending downstream of said larger throat.

It is known to entrain so-called secondary air into the divergent nozzle from a space exterior of the convergent nozzle. The mass of such entrainment is limited by the throat of the divergent nozzle. It is an object of this invention to make arrangements for enlarging the mass of air so entrained with a view to reducing the noise of the jet flow from the apparatus.

According to this invention there is provided a jet propulsion power plant comprising a gas turbine engine, a convergent exhaust nozzle for said engine, a duct surrounding said nozzle and having parts extending respectively upstream and downstream of the throat of said nozzle, the upstream part defining together with the exterior of said nozzle a passage for the entrainment of air into the downstream part, the downstream part embodying a panel defining a part of the interior of the duct, and means supporting the panel for movement about its downstream end between a first position in which the panel is inclined to the flow axis of the primary nozzle so as to constitute a throat and wall means of a divergent nozzle and a second position in which the pannel is more nearly parallel to said axis thereby to widen the latter throat and increase the entrainment of air from said passage.

It is also an object of this invention to arrange for changing the direction of flow from the convergent nozzle.

To this end, according to this invention, the downstream part of the duct has means defining an opening between the interior and the exterior of the duct, the panel is movable about its said downstream end between said first position and a third position in which the panel extends obliquely across at least a part of the flow path of gases from the convergent nozzle, and the opening means is located relative to the panel so that when the panel is in the third position the flow of gases encountered by the panel during operation of the engine is diverted by the panel through the opening.

Examples of a power plant according to this invention will now be described with reference to the accompanying drawings wherein.

Figure 1:
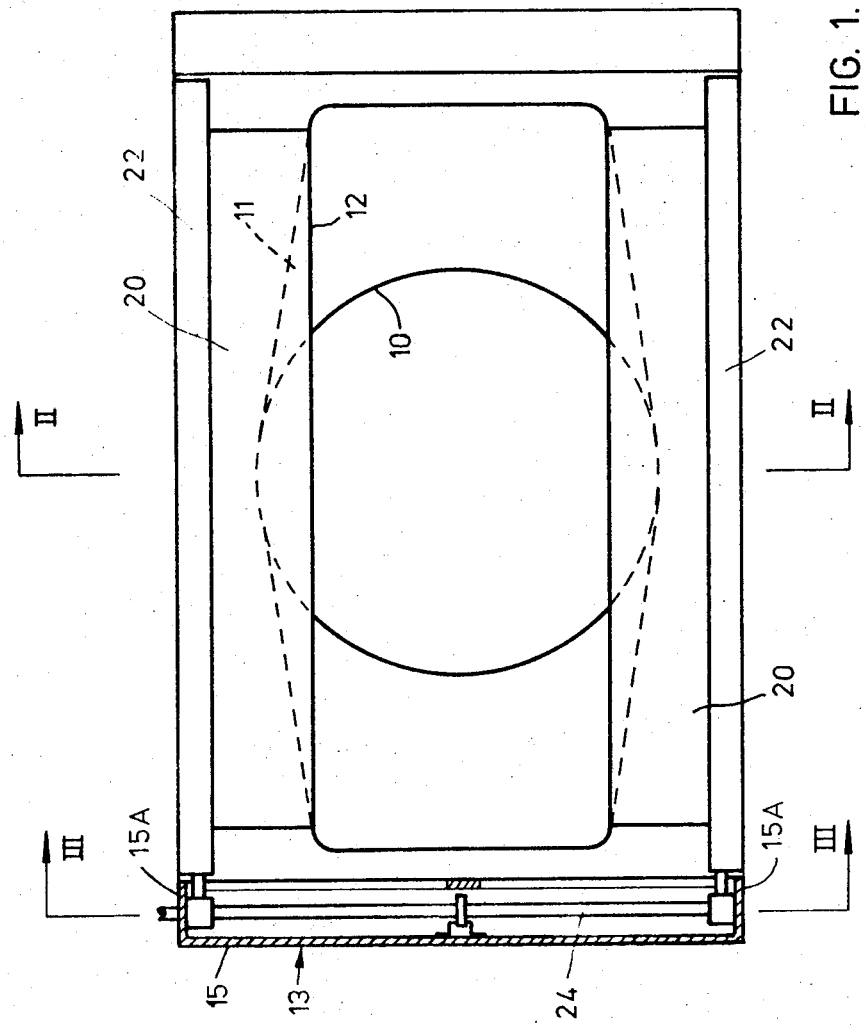
FIG. 1 is an end view of the exhaust apparatus of a power plant according to a first example.
Figure 2:
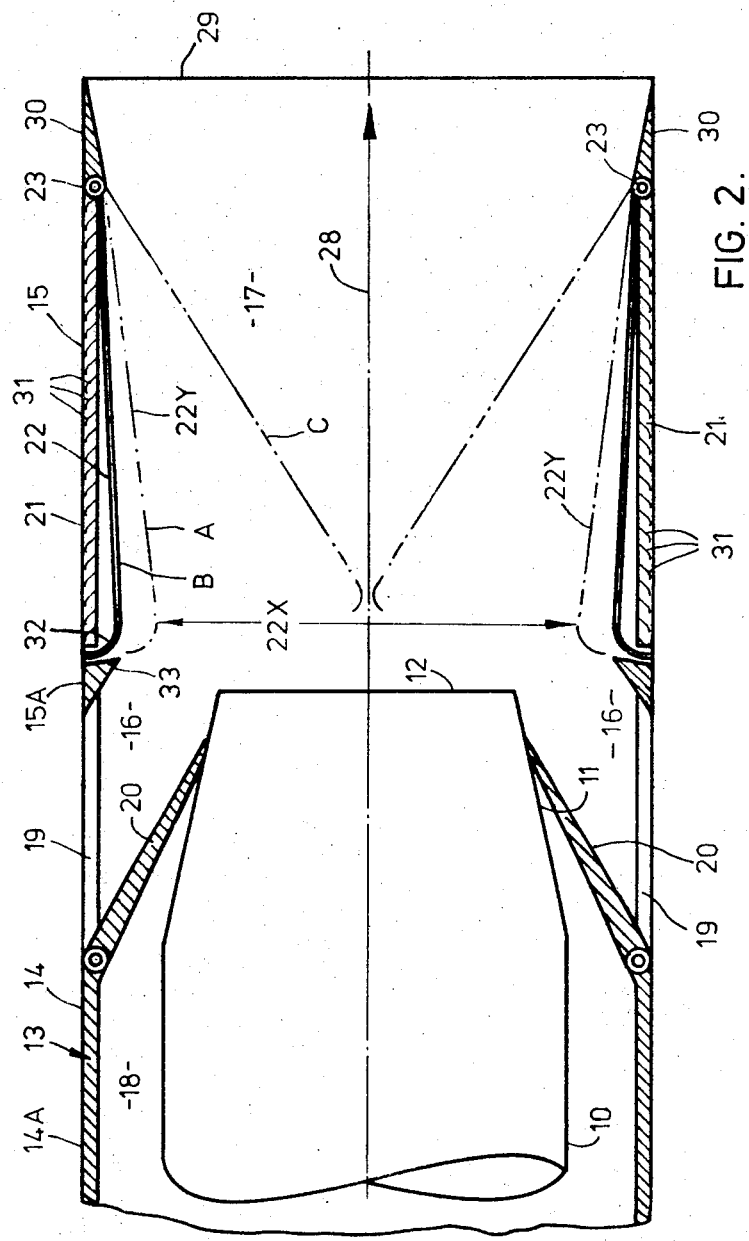
FIG. 2 is a section of the line II—II in FIG. 1
Figure 3:
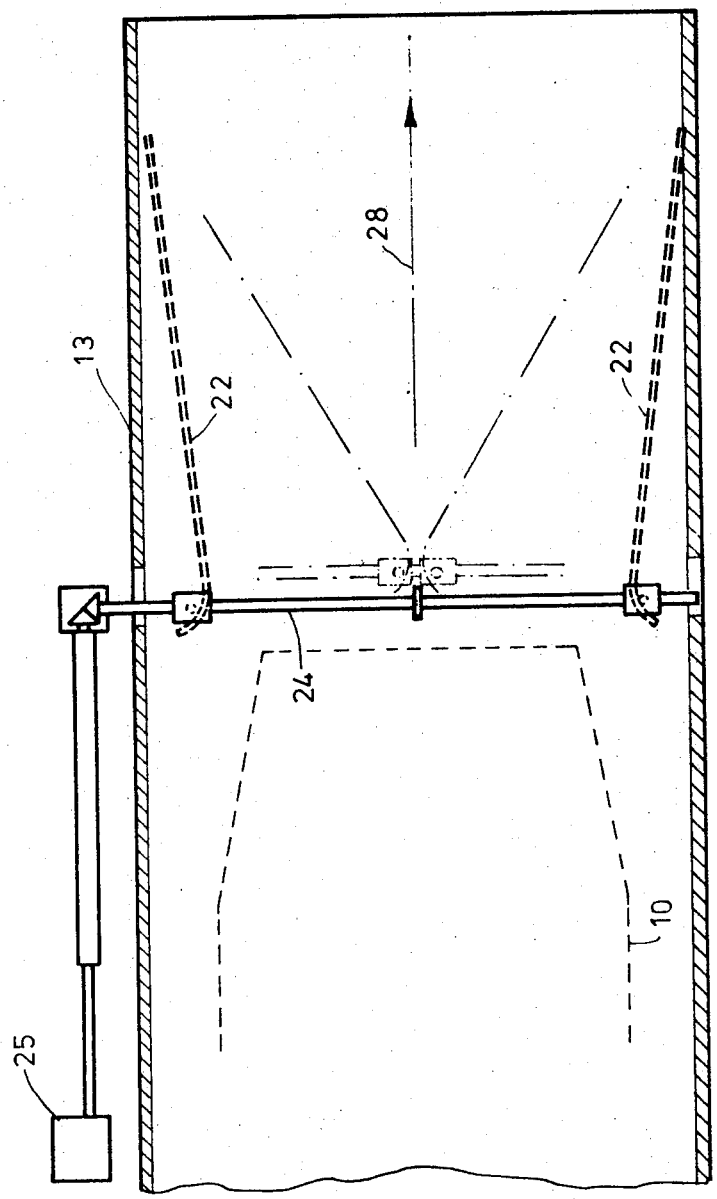
FIG. 3 is a section on the line III—III in FIG. 1

Referring to FIGS. 1 to 3, a circular section jet pipe 10 emanating from a jet propulsion engine (not shown) terminates in a convergent primary nozzle 11 of rectangular section and having a throat 12. The nozzle 11 is associated with a duct 13 having a rectangular cross section generally uniform along the length of the duct. The duct surrounds the nozzle 11 and has a part 14 situated approximately upstream of the throat 12 and constituting together with the nozzle 11 a pair of air entrainment passages 16. Approximately downstream of the throat 12 the duct has a part 15 constituting a chamber 17 in which takes place the mixing of the exhaust of the nozzle 10 and the air entrained through the passages 16. It will be seen that the passages 16 are situated at those sides of the nozzle and duct which form the long sides of the rectangular cross-section of these components.

Air flow into the passages 16 may come from by-pass ducts 18 fed from the air intake (not shown) of the engine or from auxillary inlets 19 in the part 14 and controlled by doors 20.

The duct part 15 comprises two opposite walls 15A each embodying an outlet opening 21 and each wall 15A has arranged at the inside thereof a panel 22 forming a part of the interior of the duct and supported at its downstream end on the wall 15A by a pivot 23 situated downstream of the adjacent outlet 21. The panels at the respective walls 15A are each connected to a screw 24 (FIGS. 1, 3) adapted to be rotated by a pneumatic motor 25 and having opposite hand threads such that the panels are moved towards or away from each other when the screw is rotated.

As shown in FIG. 2 each panel 22 is movable between three positions denoted A, B and C. In position A the panel cooperates in forming a throat 22X and divergent wall means 22Y of a secondary nozzle, i.e., a nozzle for controlling the expansion of the exhaust of the primary nozzle when the latter is operated at supercritical pressure ratios. Position B is for increasing the air entrainment through the passages 16. Position C is used for thrust reversal.

In the position B the surface of each panel 22 facing the interior of the chamber 17 is substantially parallel to the mean direction of flow, denoted 28, of the nozzles. Compared with position A, in which the volume of the chamber 17 is inevitably restricted by the throat 22X, in position B of the panels 22 the volume of the mixing chamber is the maximum possible within the overall cross section of the duct 13. In this way a relatively large volume of air can be entrained with consequent benefit in noise suppression and thrust augmentation without prejudicing the secondary nozzle facility obtainable in position A. It will of course be understood that position B is adopted only at take-off and low subsonic aircraft speeds when noise suppression is important and the flow augmentation is of greatest benefit in terms of thrust.

The greatest volume to which the duct can be expanded by movement of the panels 22 in position B is given by the overall thickness of the walls 15A as occurring at extremities 33. In position B the panels 22 are flush with the extremities 33. In position A the upstream or throat ends of the panels are spaced inwardly from the extremities 33 and in order to close this spacing the panels each have an extension 32 arranged at an angle to the plane of the panel and, in position B of the panel, the extremities are accommodated in a recess 34 of the wall 15A.

Although a certain amount of air is available to the passages 16 through the ducts 18, the latter are not by themselves intended to provide the whole of the entrainment air and when position B is adopted the doors 20 are opened by means known per se. The inlets 19 and doors 20 may be situated at any convenient position upstream of the nozzle throat 12 and need not be close to the chamber 17.

In the present example the by-pass flow is a spill flow from the engine intake and its mass depends on the ram effect of flight, i.e., the by-pass flow increases with flight speed. Thus, inasmuch as the efficiency of the inlets 19 reduces with flight speed, the by-pass flow will compensate for this.

At high subsonic speeds the combined supply of air from the by-pass duct and the inlets 19 may not by themselves be sufficient to fill the chamber 17 and to avoid base drag at the outlet, denoted 29, from the chamber. To avoid this the latter outlet may be provided with flaps 30 adapted to close under differential external and internal pressure.

When employing position A of the panels 22 and operating at said critical pressure ratios, the doors 20 are closed and the by-pass flow interposes itself between the expanding jet and the panels to provide a cool boundary layer.

In position C the panels 22 each extend across a half of the outlet 12 of the primary nozzle so as to divert the flow therefrom through the reverser outlets 21. The latter have cascades of vanes 31 to further divert the flow in a direction having a forward component in respect of the aircraft so as to exert a braking effect.

Figure 4:
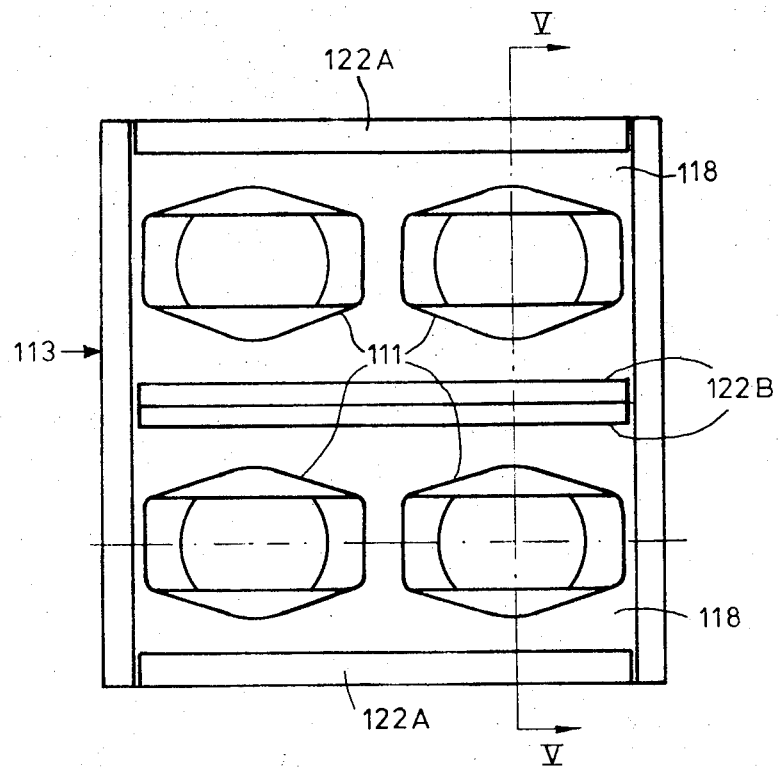
FIG. 4 is an end view of the exhaust apparatus of a power plant according to a second example.
Figure 5:
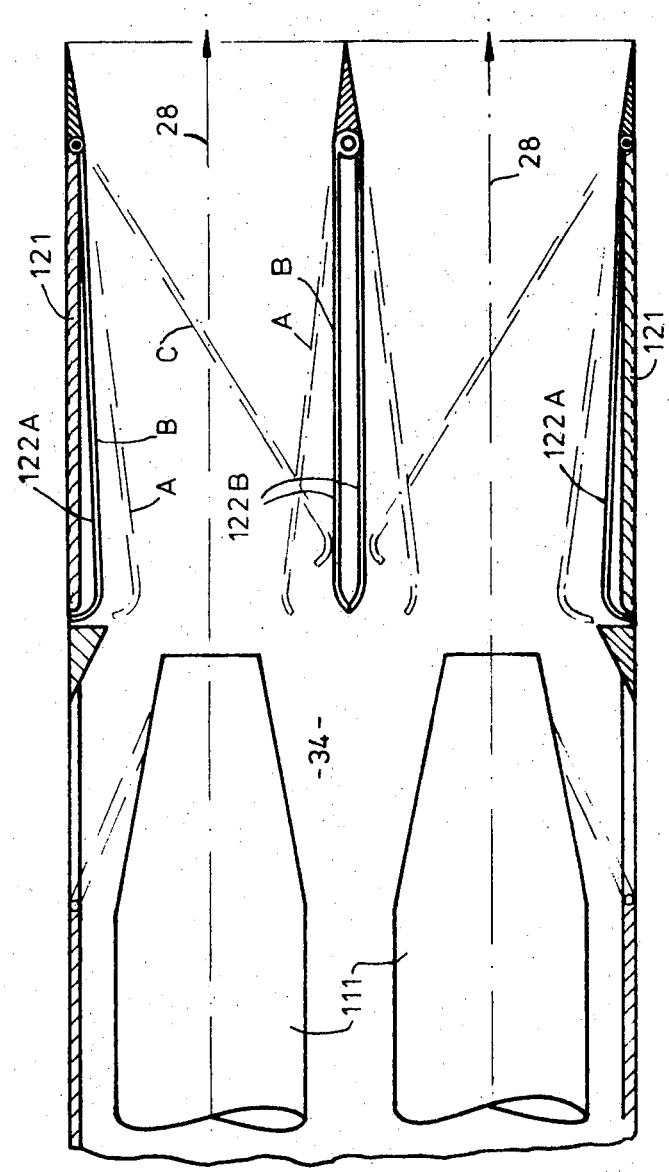
FIG. 5 is a section on the line V-V in FIG. 4.
Figure 6:
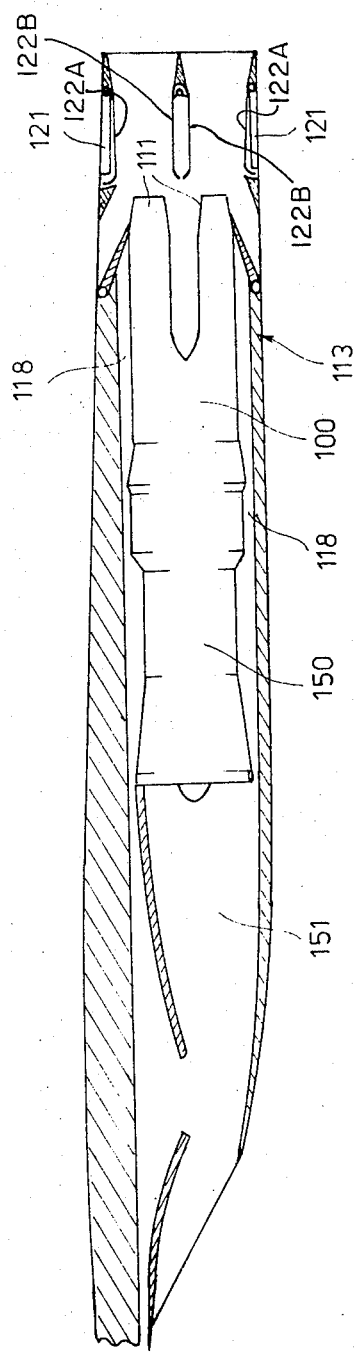
FIG. 6 is a side elevation of the latter power plant viewed as a whole.

In FIGS. 4 to 6 a jet pipe 100 is divided into four rectangular nozzles 111 arranged for their axes to be on the four corners of a square and to be collectively surrounded by a duct 113. The arrangement is such that in the side elevation (FIG. 5) two nozzles, forming a pair, are situated one above the other. In this arrangement there is but one reverser outlet 121 for each said pair of nozzles, but each pair is associated with two panels 122A, 122B. The panels 122A are situated adjacent the relevant reverser outlets 121 and are movable between positions A, B, and C. In the latter position each panel 122A extends across the whole of the flow from the associated two nozzles 111 such as to divert the whole of the exhaust therefrom through the reverser outlet. The panels 122B are movable between positions A and B only.

FIG. 6 shows that the duct 113 forms a nacelle embracing an engine 150 and having an air intake 151 which feeds both the engine itself and a by-pass passage 118 equivalent to the passage 18 of the example shown in FIGS. 1 to 3.

We claim:

1. Jet propulsion plant comprising a gas turbine engine, a convergent exhaust nozzle for said engine, the convergent nozzle having a first throat, a duct surrounding said convergent nozzle and having parts extending respectively upstream and downstream of the first throat of said convergent nozzle, the upstream part defining together with the interior of said convergent nozzle a passage for the entrainment of air into the downstream part, the downstream part embodying a panel defining a part of the interior of the duct, and means supporting the panel for movement about its downstream end between a first position in which the panel is inclined to the flow axis of the convergent nozzle so as to constitute a second throat and wall means of a divergent nozzle and a second position in which the panel is more nearly parallel to said axis thereby to widen the second throat and increase the entrainment of air from said passage.

2. Power plant according to claim 1, wherein the downstream part of the duct has means defining an opening between the interior and exterior of the duct, the panel is movable about its and downstream end between said first position and a third position in which the panel extends obliquely across at least a part of the flow path of gases from the convergent nozzle, and the opening means is located relative to the panel so that when the panel is in the third position the flow of gases encountered by the panel during operation of the engine is diverted by the panel through the opening.

3. Power plant according to claim 2, wherein the opening means and the panel are so related that when the panel is in said second position the opening is closed by the panel.

4. Power plant according to claim 3, the upstream end of the panel being spaced inwardly away from the interior of the duct when the panel is in said first position, and means being provided for bridging such spacing.

5. Power plant according to claim 4 wherein said fridging means comprises a recess in the wall of the duct adjacent the upstream end of the panel when in the second position, and an extension provided at the upstream end of the panel at an angle to the plane thereof and arranged to bridge said spacing when the panel is in said first position but to be accommodated in said recess when the panel is in the second position.

* * * * *